3,472,671
STARCH FILM-FORMERS
Ralph L. Wilkinson, Lyons, and Stanley F. Ciesla, Brookfield, Ill., assignors to Corn Products Company, New York, N.Y., a corporation of Delaware
No Drawing. Filed Apr. 3, 1967, Ser. No. 627,620
Int. Cl. C08b 25/02, 27/02
U.S. Cl. 106—214                                            4 Claims

ABSTRACT OF THE DISCLOSURE

Covers improved starch film-formers formed by reaction of a starch amide and a halogen donor compound. Also, covers their method of preparation, and use in treating surfaces such as in coating cellulosic fibrous articles, including paper and textiles. Specifically, is involved with paper coating compositions, and their use in increasing paper wet-rub resistance after coating a paper article therewith.

---

There has been an ever-continuing demand for a coating material which may be applied to a number of varying substrates, and that will impart to the treated article improved properties. For example, coatings are often applied to cellulosic fibrous materials such as textiles and paper. In the area of textile treatment, film-formers are applied in order to increase water and oil resistance, crease-resistance, render the material soft to the touch, etc.

The article particularly developed with respect to coating paper in order to improve its water resistance, wet and dry strengths, adsorptive capacity for printing, optical properties, etc. Specifically, there has been an increased demand for coated paper and cardboard with a greater resistance to water, and more specifically to produce paper articles which have excellent wet-rub resistance. Paper articles resistant to water are necessary in offset printing, for containers and labels for frozen foods, and for many other applications in which there is a probability that the coating will come in contact with water or a moist atmosphere. Other types of paper such as wallpaper, posters, cartons, etc. also fall within this category of requiring water resistance.

Generally, the most important components of a coating preparation for paper are usually a pigment, such as clay, and a binding agent, which serves to bind the pigment particles together and make them adhere to the paper surface. Different types of starch have already been used for a long time as binding agents in coating preparations for paper.

In view of the just-discussed demand for coated paper having good wet-rub resistance, many attempts have been made to modify starch in order to improve the wet-rub resistance of paper coatings containing modified or derivatized starch as a binder. In the past, the difficulties often encountered with coatings have included cost, lack of ease of application to the paper, tendency to foam and spoil sheets, undesirable odor, insufficient water resistance, unusually high concentration of binder required to achieve desired result, etc.

It would be a distinct advantage to discover a material which would not possess any of the above disadvantages, and that could be used as a unitary additive without resort to additional materials to make the binder substance insoluble. Moreover, if a binder had sufficient storage stability to allow the paper processor time to formulate coatings, and subsequently use the formulated coatings at his convenience, such paper coating binders would have extreme utility.

Casein has frequently been used as a binder for high wet-rub resistance coatings. However, casein-based coatings have a number of disadvantages, particularly, in their relatively high cost, necessity for importation, and susceptibility to spoilage and putrefaction.

It, therefore, becomes an object of the invention to provide improved film-formers that are derived from starch.

A specific object of the invention is to provide unique cross-linked starch derivatives which may be used to treat a number of articles to improve their properties.

Yet another object of the invention is to provide starch-derived film-formers which may be useful in treating cellulosic fibrous substances, like paper and textiles.

A specific object of the invention is to provide paper coatings composed of an improved starch binder and pigment, which will impart excellent wet-rub resistance to paper members treated therewith.

Other objects will appear hereinafter.

In accordance with the invention, we have discovered improved starch film-formers, useful in a number of varying applications. These film-formers or adhesives comprise the reaction product of: (A) a starch amide having substituted on the starch unit an amide group adjacent to an alpha-methylene group, and (B) a second compound which is capable of donating a halogen by way of reaction with the starch amide. The product compounds are useful in treating a number of substrates such as cellulosic fibrous materials including textiles and paper articles. They find particular utility as binders in combination with inorganic pigments such as clay to provide improved paper coating compositions, which when applied to paper substrates measurably increase water resistance, and particularly wet-rub resistance.

The starch film-formers of this invention are also particularly useful in imparting oil and water resistance to textiles, as well as increasing crease-resistance of thus treated textile articles. When added to paper pulp at the wet end of the paper-making process, the starch derivatives increase wet and dry strength of the resultant dried paper material. While discussion below will be centered about paper coating compositions and methods of treating paper articles to improve their properties, it is understood that other substrates, as examplified above, may also be usefully treated with the compositions of the invention.

The basic starch material employed as one of the reactants to achieve the products of the invention is a starch amide which contains in the substituent radical a methylene group alpha to the amide group. A typical material of this type is a starch propionamide ether. Such materials are well known and need little elaboration. The preparation of materials of this type, suitable in the invention, is adequately described in U.S. 3,033,852 granted to Eugene F. Paschall on May 8, 1962 and assigned to Corn Products Company, the disclosure of which is herein incorporated by reference. Other starch amides may also be employed, as long as there is available in the molecule a methylene group alpha to an amide group, the entire structure of which is capable of reaction with the halogen donor compound. Preferred starch amide derivatives useful as reactants have a degree of substitution (D.S.) of from about 0.05 to about 3.0, and more preferably within the range of about 0.05 to about 1.0. The starch amide material may be gelatinized prior to contact with the halogen donor, or may be maintained in granule from prior to the reaction.

The halogen donor compound may be selected from a wide number of substances capable of this phenomenon of halogen release, both organic and inorganic. Preferred halogen donors are alkaline earth and alkali metal hypohalites, such as calcium hypochlorite, sodium hypochlorite, sodium hypobromite, etc., with alkali metal hypohalites being most preferred. Other suitable donors may include N,N-dichlorobenzene sulfonamide, N-chlorosuccinimide, N-chlorophthalimide, trichloromelamine, hexachloromelamine, etc.

A number of variables are important in preparing the products of the invention, in order to achieve a final material capable of imparting the desired properties to paper. Operating outside these conditions will result in the preparation of an unusable irreversible gel, or a material which has little ability to properly affix itself to paper to produce the required water-resistant coating.

The reaction itself should be run on the basic side, and in the most preferred embodiment is run at a pH greater than about 10, and most preferably greater than about 11. The time of the reaction is important, and the reaction should usually be completed in a period of time ranging from about 5 to about 60 minutes. The reaction is somewhat temperature sensitive, and thus, preferably, the reaction is run at about room temperature, through lower temperatures around about 10° C. are also acceptable. The temperature of reaction may range as high as about 45–60° C., but a higher temperature range is undesirable.

The ratio of the reactants is also quite important. Good results are obtained when from about 0.1 to about 5 equivalents of halogen donor per equivalent of starch amide is utilized. The calculated equivalent weight of the starch amide as reactant used in the above ratio is based only on the amide substituent radical portion of the starch, which, of course, is dependent upon and calculated by the degree of substitution of the starch. That is, knowing the degree of substitution and equivalent weight of the substituent group, say 72 for propionamide, one can calculate the amount of starch amide needed in the reaction to provide the required amide equivalent falling within the above range.

When properly prepared, the starch film-formers are partially cross-linked, though in such a form that they can still be applied with ease to the substrates such as paper to be treated.

The reaction itself may be carried out in aqueous medium, and the resultant aqueous suspension of product used as a binder in the preparation of a clay coating. In yet another embodiment of the invention, the reaction product may be isolated from the reaction medium by the addition of a polar organic substance such as alcohol, which aids in precipitating out the reaction product. The precipitation is preferably carried out under a mildly acid environment. This product may then be subsequently added to water as needed, and combined with an appropriate inorganic pigment.

In an extremely attractive alternate procedure, the binders of the invention are formed in aqueous suspension, in the presence of the particular pigment such as clay, to be utilized, as a portion of the coating. Thus, at completion of the reaction a suitable coating color is formed and is in condition for immediate use without further formulation.

In still another modification of the invention, a coating is laid down containing only starch amide and pigment. To this is then added the halogen donor to complete the reaction and permanently affix the coating to the paper article to achieve the required wet-rub resistance. Other modes of preparation of the film-formers of the invention, and their use as paper coating compositions, should be apparent to the reader. The various means of preparation and application are distinct advantages of the invention, and lend extreme versatility to its practice.

As outlined above, the coating composition generally comprises a mixture of water with clay or another inert mineral pigment, and a binder in accordance with this invention. A dispersing agent, such as sodium hexametaphosphate, trisodium polyphosphate, tetrasodium pyrophosphate, or the corresponding potassium salts, is often added. Moreover, an alkaline material, such as sodium hydroxide, ammonium hydroxide, or various other alkaline salts or hydroxides of alkali metals, can also be present. The dispersing agent, together with the alkaline material, serves to disperse the pigment. The alkaline material aids in adjusting the pH to the desired value for application, which frequently is about pH 8. If desired, various other additives such as anti-foaming agents and preservatives can be added.

If the starch film-formers are not prepared in gel form, it is usually preferable, prior to addition to the pigment, that the derivatives be first "cooked" in water, that is, heated to a temperature above the gel point of the starch. If already pasted, of course, this step is not necessary.

The pigment portion of the slip may be chosen from a wide variety of inorganic metallic pigments such as clay, talc, titanium dioxide, blanc fixe, powdered tin, precipitated chalk, satin white, ground limestone, etc. Preferred due to ready availability and relatively low cost is clay.

The amounts of the various substituents of the new coating preparations are naturally strongly dependent upon the type and amount of starch derivative, the type of inorganic pigment, process of application of coating, as well as the properties desired in the finally coated paper. Generally speaking, the coating color contains 20%–70% solids, including 30%–60% of one or more of the above discussed inorganic pigments, based on solids weight, and 5%–25% of the starch-based binder of this invention, based on total solids weight. The above percentage figures are expressed in weight percent. It is understood, of course, that other known starch binders may be used along with the starch-based binder materials herein defined, without departing from the scope of the invention.

The actual introduction of the new coating preparations for treating paper or cardboard can be carried out in a variety of ways. Thus, for example, one may use coating members such as an air knife, application roll, a bar wrapped with a wire, a "trailing blade," and a sealing press. After application, the coatings obtained must usually be dried in order to cure the coated paper and bring about the desired property of increased water-resistance. Curing may be effected at room temperature or accelerated by heating the coated paper by various known drying devices.

The following examples illustrate specific preparations of typical starch film-formers of the invention, and their use as binders in paper coatings. These examples are meant to be illustrative, and the invention, of course, is not to be limited thereto. All parts and percentages are by weight unless expressly stated to be otherwise.

Example I 900 grams of aqueous clay slurry (72% solids) along with 0.3% tetrasodium pyrophosphate, based on clay, were slurried together at 25° C. with 584 grams of a 20% starch propionamide paste (0.21 D.S., 70 fluidity). 150 ml. of 1 N sodium hydroxide was then added to the above and stirred 10 minutes before 13.8 grams of calcium hypochlorite (70.2% active chlorine) was added. The final coating color was 18 parts binder per 100 parts clay, and contained 47.5% solids, dry basis.

The above coating was applied to glass plates with a Boston-Bradley applicator, dried, cured and tested for water resistance. The glass plates were scrubbed with a modified Gardener wet-scrub tester using a wet felt block as the scrubbing tool. These films had water resistance up to 2000 scrubs for the plates cured 5 minutes at 150° C. and up to 1700 scrubs for the plates aged one month at room temperature. In this particular scrub test, the felt was moved across a wetted coating, and strokes counted until ½ inch portions were cut off at each end of the coating, due to the applied friction. This coating of the invention was comparable to a casein coating with respect to wet-rub resistance, without possessing the known disadvantages of casein coatings.

The above coating color was also applied to a paper with Mayer rods. Two sets of paper coatings were dried and cured at both room temperature and a higher temperature. In this test, the papers were tested for their wet-rub resistance by placing a drop of water on the edge of the sheet and repeatedly rubbing onto a black glass plate. The first sign of coating color rub off or smudging was considered the end point. All coatings resisted more than 50 wet finger rubs. This compares favorably with a starch binder cross-linked with glyoxal, which showed coating color rub off at about 3 finger rubs. The clear superiority of the starch derivative of this invention in promoting water resistance, and particularly wet-rub resistance, is obvious.

Example II 50.0 grams (0.0594 mole of amide) of starch propionamide having a D.S. of 0.21 was pasted up by cooking in 300 ml. of water. After cooling the paste to 18° C., 5.94 ml. of 1 N sodium hydroxide (0.00594 mole) was added to the paste. A 10.8 pH solution of sodium hypochlorite, 0.68 molar, was added to the paste in an amount of about 142 ml. of hypochlorite solution. After addition of the sodium hypochlorite, water was added to adjust the paste volume to 500 ml. After 2 minutes of reaction time an additional 5.06 ml. of 1 N sodium hydroxide was added to adjust the pH from 11.1 to 11.4. Total caustic added was 0.011 mole. Further reaction was carried out to a total time of 1 hour at 18° C., during which time the pH fell to 10.7. After this time the paste was precipitated in 10% acetic acid in methanol, and then was washed several times with the same precipitant. This was followed by additional washes with 100% methanol. The product film-former analyzed 3.2% chlorine, dry/basis, by fusion techniques; 0.5% ash, DB, expressed as sulfate, and 1.4% nitrogen, DB.

An adhesive was prepared employing 10.7 grams of the starch film-former, prepared as described above, stirred in 52.1 grams of water at a pH of 11.5. After 5 minutes stirring a suitable coating preparation was made by combining 75.0 g. of a 72% clay slip at 7.0 pH (54.0 grams of clay, DB) with 67.0 grams of the above diluted adhesive (9.72 g., DB).

Example III

Samples of coating colors were prepared according to the directions set forth in Example II. After varying amounts of reaction time the coating preparations were immediately applied to paper.

Plates were coated with these coating preparations and scrubbed in the wet-scrub test described above. Results are as follows:

TABLE I

| Reaction time-room temperature: | Wet scrubs |
|---|---|
| 15 minutes | 1180 |
| 1 hour | 1199 |
| 2 hours | 2320 |
| 3 hours | 1710 |

The starch that may be used in practicing the invention may be derived from any vegetable source, such as, for example, corn, wheat, potato, tapioca, rice, sago and grain sorghum. Waxy starches may also be used. The term "starch" is used broadly herein, and encompasses unmodified starch and tailings, and, as well, starch that has been modified by treatment with acids, alkalis, enzymes, or oxidizing agents. Soluble or partially soluble modified starches, dextrins, pregelatinized products, and starch derivatives are also suitable for use in the process. Preferred starches have a molecular weight of at least 5000, more preferably at least 10,000 and most preferably at least 20,000. If the starting starch material is already derivatized in some manner, it is nevertheless useful as long as the product is still essentially amylaceous in nature and still containing hydroxyl groups capable of reacting with reagents to introduce an amide group into the molecule. For example, the starting starch material may be initially phosphorylated or contain other cationic, anionic or non-ionic groups, and may thereafter be amidified. Preferred already derivatized starting starches have a D.S. before amidification of less than 1.0, more preferably less than 0.5 and most preferably less than 0.1.

While the invention has been described in connection with specific embodiments thereof, it will be understood that it is capable of further modification. Further, this application is intended to cover any variations, uses, or adaptations of the invention following, in general, the principles of the invention, including such departures from the present disclosure as come within known or customary practice in the art to which the invention pertains, and as may be applied to the essential features hereinbefore set forth, and as fall within the scope of the invention and the limits of the appended claims.

The invention is hereby claimed as follows:

1. A method of treating cellulosic fibrous articles to improve properties thereof which comprises applying and affixing thereto a starch film former which is made by reacting at a pH greater than 10 and at a temperature ranging from about 10° C. to about 60° C. (A) a starch amide having as a substituent radical on the starch unit an amide group adjacent to an alpha-methylene group, said starch amide having a D.S. ranging from about 0.05 to about 3.0 with (B) a halogen donor compound selected from the group consisting of calcium hypochlorite, sodium hypochlorite, sodium hypobromite, N,N-dichlorobenzene sulfonamide, N-chlorosuccinimide, N-chlorophthalimide, trichloromelamine, and hexachloromelamine, said reactants being present in a ratio ranging from about 0.1 to about 5.0 equivalents of amide substituent groups per equivalent of halogen donor.

2. A method of treating a paper article to increase its wet-rub resistance and to improve other properties which comprises the steps of coating said paper with the starch film former of claim 1.

3. A paper coating composition comprising an aqueous liquid having suspended therein 20–70 weight percent solids including 30–60% of an inorganic pigment based on the total solids weight and 5%–25% of a starch said starch produced by reacting at a pH greater than 10 and at a temperature ranging from 10° C. to about 60° C. (A) a starch amide having as a substituted radical on the starch unit an amide group adjacent to an alpha-methylene group, said starch amide having a D.S. ranging from about 0.05 to about 3.0 with (B) a halogen donor compound selected from the group consisting of calcium hypochlorite, sodium hypochlorite, sodium hypobromite, N,N-dichlorobenzene sulfonamide, N-chlorosuccinimide, N-chlorophthalimide, trichloromelamine, and hexachloromelamine, said reactants being present in a ratio ranging from about 0.1 to about 5.0 equivalents of amide substituent groups per equivalent of halogen donor.

4. The composition of claim 3 wherein said inorganic pigment is clay.

References Cited

UNITED STATES PATENTS

| 3,035,045 | 5/1962 | Trimnell | 260—233.3 |
| 3,033,852 | 5/1962 | Paschall | 260—233.3 |
| 2,989,521 | 6/1961 | Senti et al. | 260—233.3 |

OTHER REFERENCES

Kolthoff and Sandell, Textbook of Quantitative Inorganic Analysis, 1952, 3rd edition, pp. 557–560.

JULIUS FROME, Primary Examiner

T. MORRIS, Assistant Examiner

U.S. Cl. X.R.

117—156, 165; 127—33; 260—233.3